(12) United States Patent
Kim et al.

(10) Patent No.: US 7,411,630 B2
(45) Date of Patent: Aug. 12, 2008

(54) APPARATUS AND METHOD FOR TRANSPOSING DATA IN THE DISPLAY SYSTEM USING THE OPTICAL MODULATOR

(75) Inventors: Chang Hyun Kim, Yongin-Si (KR); In Jae Yeo, Yongin-Si (KR)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 472 days.

(21) Appl. No.: 11/026,805

(22) Filed: Dec. 30, 2004

(65) Prior Publication Data

US 2006/0103679 A1    May 18, 2006

(30) Foreign Application Priority Data

Nov. 16, 2004    (KR) .................. 10-2004-0093591

(51) Int. Cl.
*H04N 3/28*    (2006.01)
*H04N 9/64*    (2006.01)

(52) U.S. Cl. ..................... 348/716; 348/206
(58) Field of Classification Search .............. 348/206, 348/583, 714–717; 711/154, 155; 382/296, 382/297; 345/600, 603, 533, 549, 550, 561, 345/566, 571, 568, 569, 574, 655, 658; 358/1.18, 358/1.16, 1.17; 708/442, 809
See application file for complete search history.

(56) References Cited

U.S. PATENT DOCUMENTS

| | | | | |
|---|---|---|---|---|
| 4,052,699 A | * | 10/1977 | Micka et al. | ........... 382/297 |
| 4,303,986 A | | 12/1981 | Lans et al. | |
| 4,472,732 A | * | 9/1984 | Bennett et al. | ........... 348/452 |
| 4,703,515 A | * | 10/1987 | Baroody, Jr. | ........... 382/297 |
| 4,989,092 A | * | 1/1991 | Doyle et al. | ........... 348/448 |
| 5,267,045 A | * | 11/1993 | Stroomer | ........... 348/441 |
| 5,973,707 A | | 10/1999 | Mita et al. | |
| 5,982,443 A | * | 11/1999 | Chung | ........... 348/441 |
| 6,097,855 A | * | 8/2000 | Levien | ........... 382/296 |
| 6,208,767 B1 | * | 3/2001 | Chapin | ........... 382/296 |
| 6,211,918 B1 | | 4/2001 | Uwabata et al. | |

(Continued)

FOREIGN PATENT DOCUMENTS

JP    58133077    8/1983

(Continued)

OTHER PUBLICATIONS

Patent Abstracts of Japan for JP 05207264 A filed on Jan. 30, 1992.

*Primary Examiner*—Victor R Kostak
(74) *Attorney, Agent, or Firm*—Darby & Darby P.C.

(57) ABSTRACT

Disclosed herein is an apparatus and method for transposing data. The apparatus includes a pair of line memories, a pair of memories and output units. The line memories horizontally read image data a frame of which is composed of K×L byte data (row length: K bytes, column length: L bytes), and alternately storing data arrays each having a K×N byte size (N≧2). The memories alternately reads the image data from the line memories on an N-byte-at-a-time basis and each store a data array corresponding to one frame. The output units vertically address the data arrays stored in the memories on an N-byte-at-a-time basis and output the addressed data arrays.

5 Claims, 10 Drawing Sheets

U.S. PATENT DOCUMENTS

| | | | |
|---|---|---|---|
| 6,229,571 B1 | 5/2001 | Sato et al. | |
| 6,720,978 B2 * | 4/2004 | Peng et al. | 345/658 |
| 6,788,617 B1 * | 9/2004 | Lee | 365/240 |
| 6,847,370 B2 * | 1/2005 | Baldwin et al. | 345/564 |

FOREIGN PATENT DOCUMENTS

| | | |
|---|---|---|
| JP | 60142449 | 7/1985 |
| JP | 61220866 | 10/1986 |
| KR | 10199821019 | 6/1998 |

* cited by examiner

FIG. 1a

PRIOR ART

INPUT DATA SEQUENCE

FIG. 1b

PRIOR ART

1920 × 4 BYTES

| (0,0) | (1,0) | (2,0) | (3,0) | (0,1) | (1,1) | (2,1) | (3,1) | ... | (0,1919) | (1,1919) | (2,1919) | (3,1919) |
|---|---|---|---|---|---|---|---|---|---|---|---|---|
| (4,0) | (5,0) | (6,0) | (7,0) | (4,1) | (5,1) | (6,1) | (7,1) | ... | (4,1919) | (5,1919) | (6,1919) | (7,1919) |
| ⋮ | ⋮ | ⋮ | ⋮ | ⋮ | ⋮ | ⋮ | ⋮ | ⋮ | ⋮ | ⋮ | ⋮ | ⋮ |
| (1076,0) | (1077,0) | (1078,0) | (1079,0) | (1076,1) | (1077,1) | (1078,1) | (1079,1) | ... | (1076, 1919) | (1077, 1919) | (1078, 1919) | (1079, 1919) |

1080/4 BYTES

APPARATUS AND METHOD FOR TRANSPOSING DATA IN THE DISPLAY SYSTEM USING THE OPTICAL MODULATOR

INCORPORATION BY REFERENCE

The present application claims priority under 35 U.S.C. §119 to Korean Patent Application No. 2004-93591 filed on Nov. 16, 2004. The content of the application is incorporated herein by reference in its entirety.

BACKGROUND OF THE INVENTION

1. Field of the Invention

The present invention relates generally to a data processing apparatus and method for transposing horizontally input image data into vertically arranged data and providing the vertically arranged image data to a scanning apparatus that requires vertically arranged data. More particularly, More particularly, the present invention relates to a data processing configuration and method capable of receiving horizontally input image data and supporting the high-speed operation of a spatial optical modulator device used in a high definition television and so forth using a memory having a limited data input/output speed.

2. Description of the Related Art

Figure 1A:
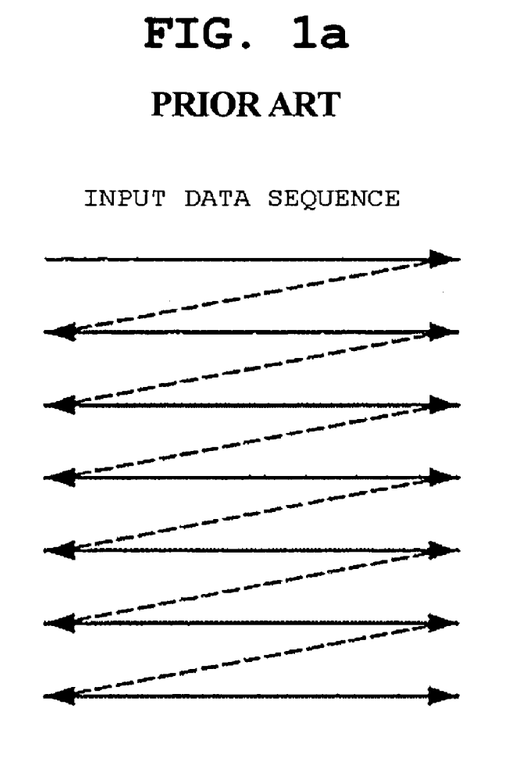
FIG. 1a is a view showing the sequence of an input video signal.

As shown in FIG. 1a, in typical High Definition Television (HDTV) application, input image data is arranged in a horizontal direction. A Spatial Optical Modulator (SOM) device, as shown in FIG. 1b, is provided with 1080 micromirror devices that are vertically arranged so that it is adapted to scan and display 1080 pieces of image data in a horizontal direction at one time.

Figure 1B:
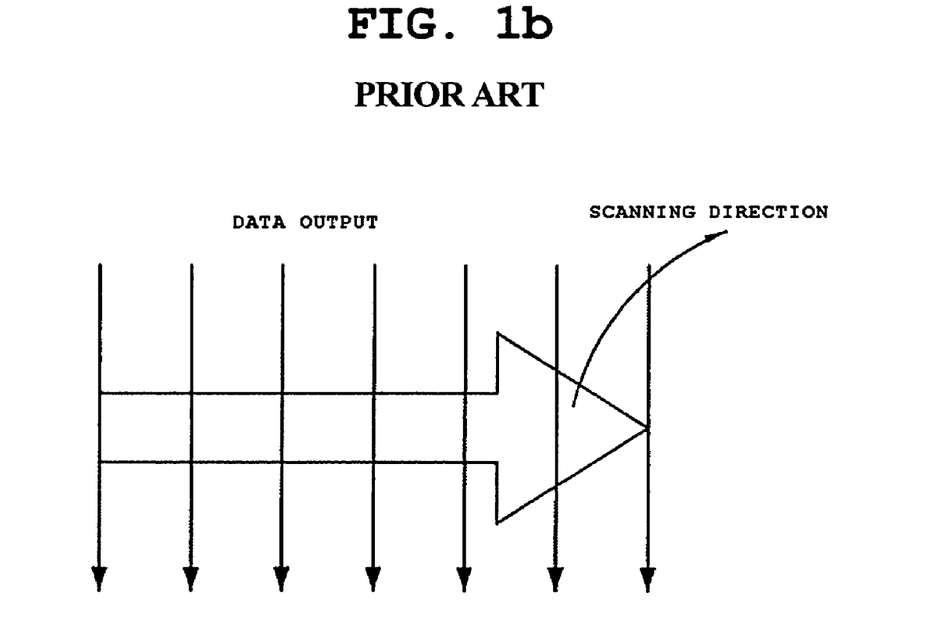
FIG. 1b is a view showing the direction of scanning that is performed by an SOM device.

The present invention relates to an apparatus and method for receiving horizontally arranged data as shown in FIG. 1a and providing a vertically arranged data array as shown in FIG. 1b.

If it is assumed that each frame of image data is composed of K×L bytes (row length: K bytes, column length: L bytes), the apparatus and method of the present invention provides data on a K×N-byte-at-a-time basis.

In a universal HDTV standard, each frame of image data has a row length (K) of 1920 pixels and a column length (L) of 1080 pixels, and each pixel is generally composed of three bytes, the three bytes corresponding to Red, Green and Blue (RGB) signals, respectively.

An SOM device used for image scanning for a universal HDTV is a device for outputting an HDTV-level image, in which 1080 micromirror cells are arranged in a line, so that the SOM device is adapted to scan and display image data in a horizontal direction. Accordingly, the SOM device requires 1080 pieces of vertically arranged data to scan each frame of image data that is composed of 1920×1080 pixels.

Figure 2A:
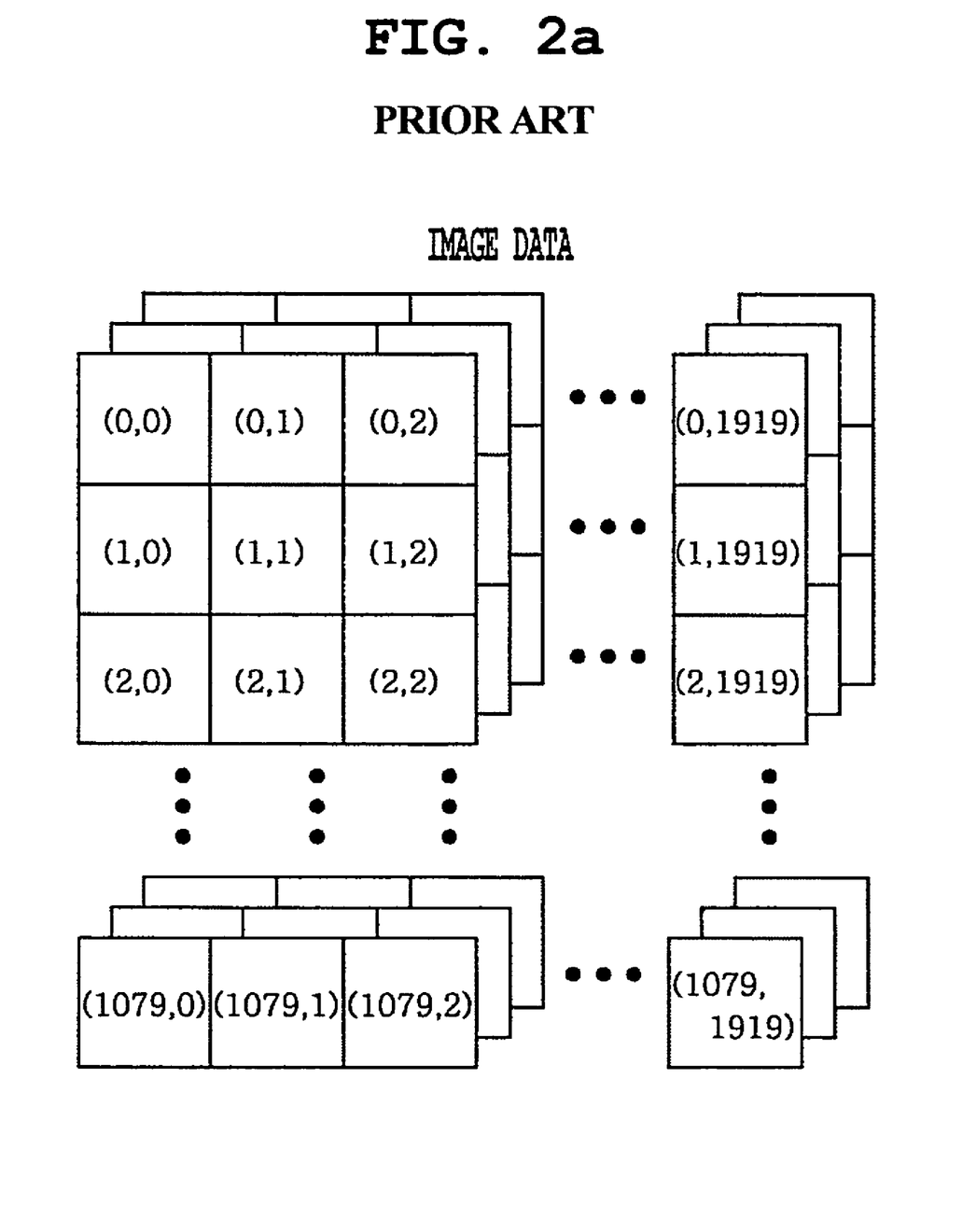
FIG. 2a is a diagram showing the structure of one frame of image data that is composed of 1920×1080 image data pixels.
Figure 2B:
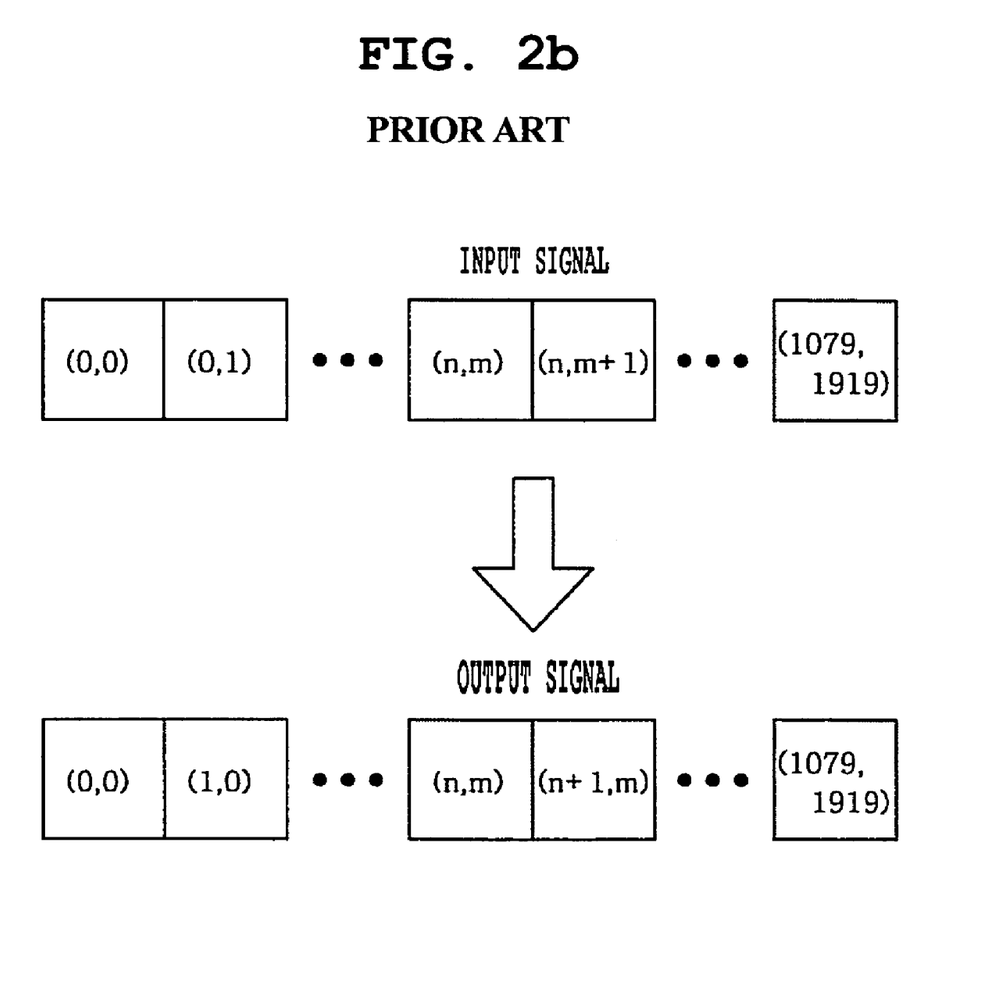
FIG. 2b is a view showing a data transposing process.

FIG. 2a shows the structure of each frame of image data that is composed of 1920×1080 pixels. The image data shown in FIG. 2a is horizontally input from the outside in the sequence of (0,0), (0,1), (0,2), (0,3), . . . . However, since the SOM device requires 1080 pieces of vertically arranged data, the input image data must be transposed from a horizontal arrangement to a vertical arrangement, as shown in FIG. 2b.

Figure 3:
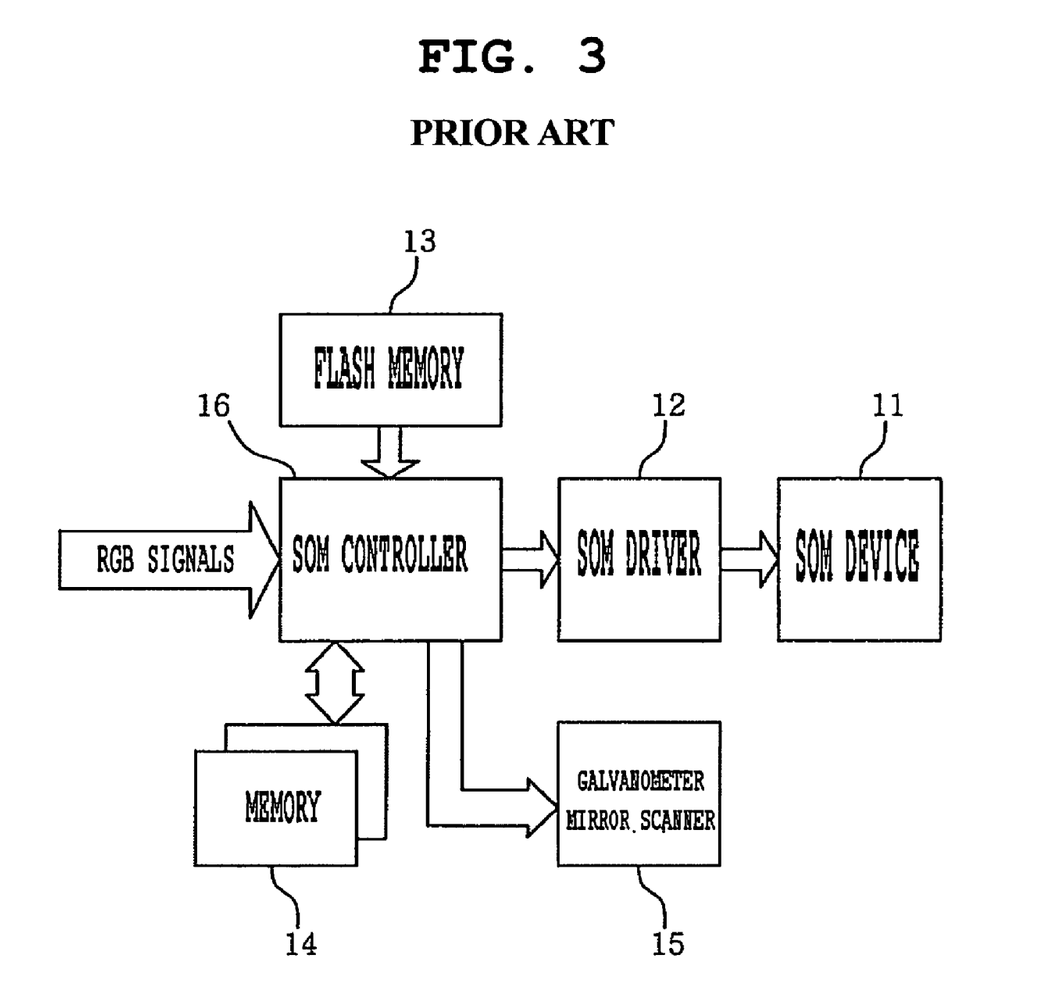
FIG. 3 is a block diagram showing a conventional data transposing apparatus for an HDTV that is implemented using a conventional SOM device.

FIG. 3 is a block diagram of a system for an HDTV that is implemented using the conventional SOM device. The system shown in FIG. 3 includes an SOM device 11, an SOM driver 12 for driving the SOM device 11, a flash memory 13 for storing a reference table to correct the characteristics of the SOM device 11, a memory 14 for storing image data, a galvanometer mirror scanner 15 for scanning an image to a screen and an SOM controller 16 for transposing the arrangement of the rows and columns of the image data and transmitting a resulting image to the SOM driver 12, and controlling the galvanometer mirror scanner 15.

Image scanning schemes for HDTVs are classified into a three-panel scheme and a one-panel scheme according to the number of electron guns used. The three-panel scheme employs three driver devices, the three driver devices taking charge of RGB colors, respectively, and three SOM devices, the three SOM devices being allocated to the three driver devices, respectively. In contrast, the one-panel scheme employs one driver device and one SOM device. Since the one-panel scheme generates RGB signals using only one SOM device, it allows the number of SOM devices, the number of SOM driver Integrated Circuits (ICs) for driving the SOM devices and the size of an optical system to be reduced to about ⅓ of those for the three-panel scheme so that an HDTV can have a simple structure and thus can be manufactured at low cost.

However, in order to implement HDTV using the one-panel scheme, the operational speed of the SOM device must be about 2 or 3 times faster than that of the three-panel scheme, and a driver for driving the SOM device and an SOM device controller for transferring data must also operate at such a speed.

In an apparatus and method for transposing data used in the application of an HDTV and providing the transposed data to an SOM device, a memory capable of storing data corresponding to at least one frame of image data is required to transpose the arrangement of the rows and columns of data.

In order to store one frame of image data at HDTV-level resolution (1920×1080 pixels), at least 2×3 Mbytes, which are too large to be implemented in an IC, are required. Accordingly, in order to store data, an additional memory, such as external memory, is required.

In order to store 1920×1080 pixels on a 1×3-byte-at-a-time basis at a reference frequency of 60 Hz in real time, a write operation must be performed at about 150 MHz. In particular, since the SOM device of the one-panel scheme outputs all the RGB signals using only one SOM device, it must operate at a speed about 2 or 3 times faster than that of the three-panel scheme at the time of transmitting data to the SOM controller.

In the case of using an external memory, the external memory has a limitation in increasing a data input/output speed, so that the external memory cannot guarantee operational reliability when the above-described fast operational speed is required, and a possibility that noise is caused by high-speed operation increases.

Accordingly, a data processing scheme for performing the high-speed operation of the SOM device without increasing the data input/output speed of the external memory is required.

Japanese Unexamined Patent Publication No. 5-207264 discloses an image memory device capable of transposing the arrangement of the rows and columns of image data read by a scanner in a facsimile or the like. The above document discloses a configuration for transposing the arrangement of data in such a way as to record data along a column direction using a row data buffer at the time of recording data in a memory array and to read the data along a row direction using a column data buffer at the time of reading the data. However, the memory configuration disclosed in the above document has limitations in that it cannot be used to process moving images and cannot be applied to applications that require high-speed data processing, such as an HDTV.

SUMMARY OF THE INVENTION

Accordingly, the present invention has been made keeping in mind the above problems occurring in the prior art, and an object of the present invention is to provide a data processing method and apparatus capable of implementing the high-speed operation of a scanning apparatus, such as an SOM device, without increasing the data input/output speed of the memory at the time of transposing data.

In order to accomplish the above object, the present invention provides an apparatus for transposing data, including a pair of line memories for horizontally reading image data a frame of which is composed of K×L byte data (row length: K bytes, column length: L bytes), and alternately storing data arrays each having a K×N byte size (N≧2); a pair of memories for alternately reading the image data from the line memories on an N-byte-at-a-time basis and each storing a data array corresponding to one frame; and output units for vertically addressing the data arrays stored in the memories on an N-byte-at-a-time basis and outputting the addressed data arrays.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 4:
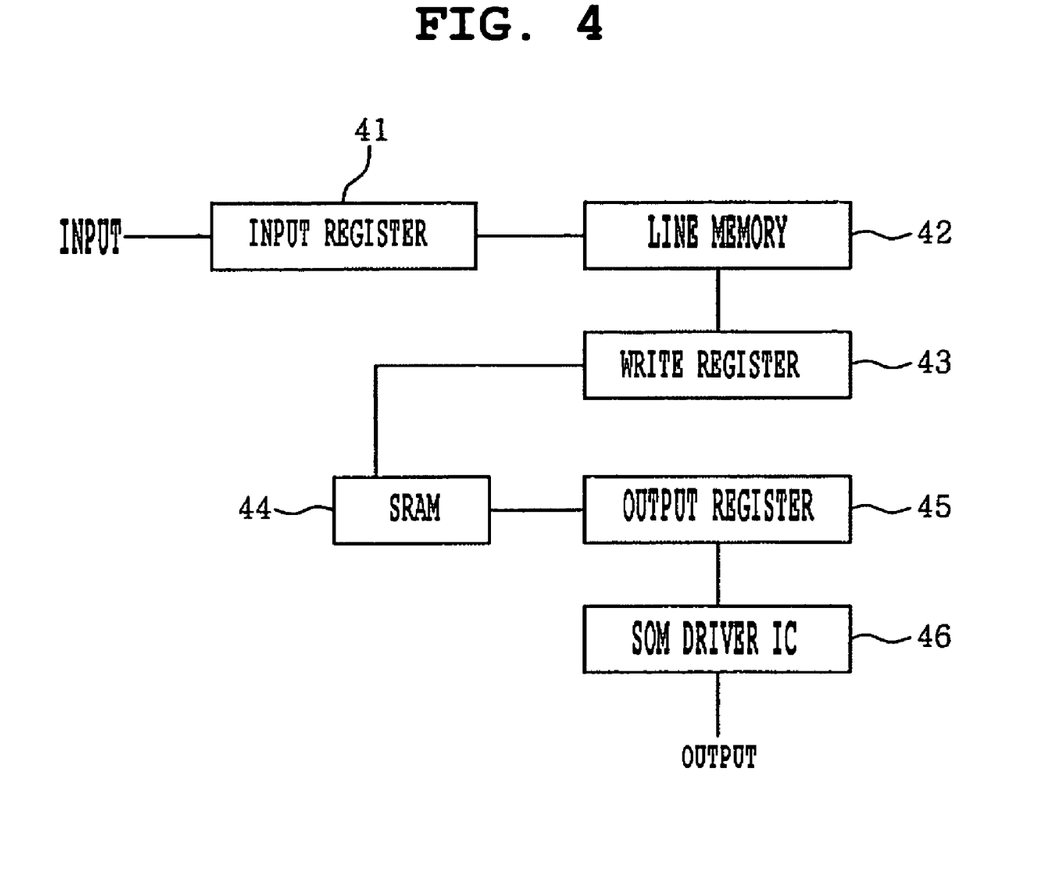
FIG. 4 is a schematic diagram showing the configuration of a data transposing apparatus in accordance with the present invention.

FIG. 4 is a schematic diagram showing the configuration of an apparatus for transposing data in accordance with the present invention. As shown in FIG. 4, the data transposing apparatus of the present invention includes an input register 41 for transferring RGB image data, each frame of which is composed of K×L byte data (row length: K bytes, column length: L bytes), on a predetermined number of bytes-at-one-time basis such as a 2-byte-at-a-time basis; a line memory 42 for storing data received from the input register 41 in the form of a data array having a K×N byte size (N≧2); a write register 43 for transferring the data array stored in the line memory 42 to a memory on an N-byte-at-a-time basis; a memory 44 for storing image data corresponding to one frame; an output register 45 for reading image data stored in the memory 44; and an SOM driver IC 46 for receiving image data from the output register 45 and transmitting the image data, which will be scanned, to an SOM device. The memory 44 is preferably a Static Random Access Memory (SRAM).

Figure 5:
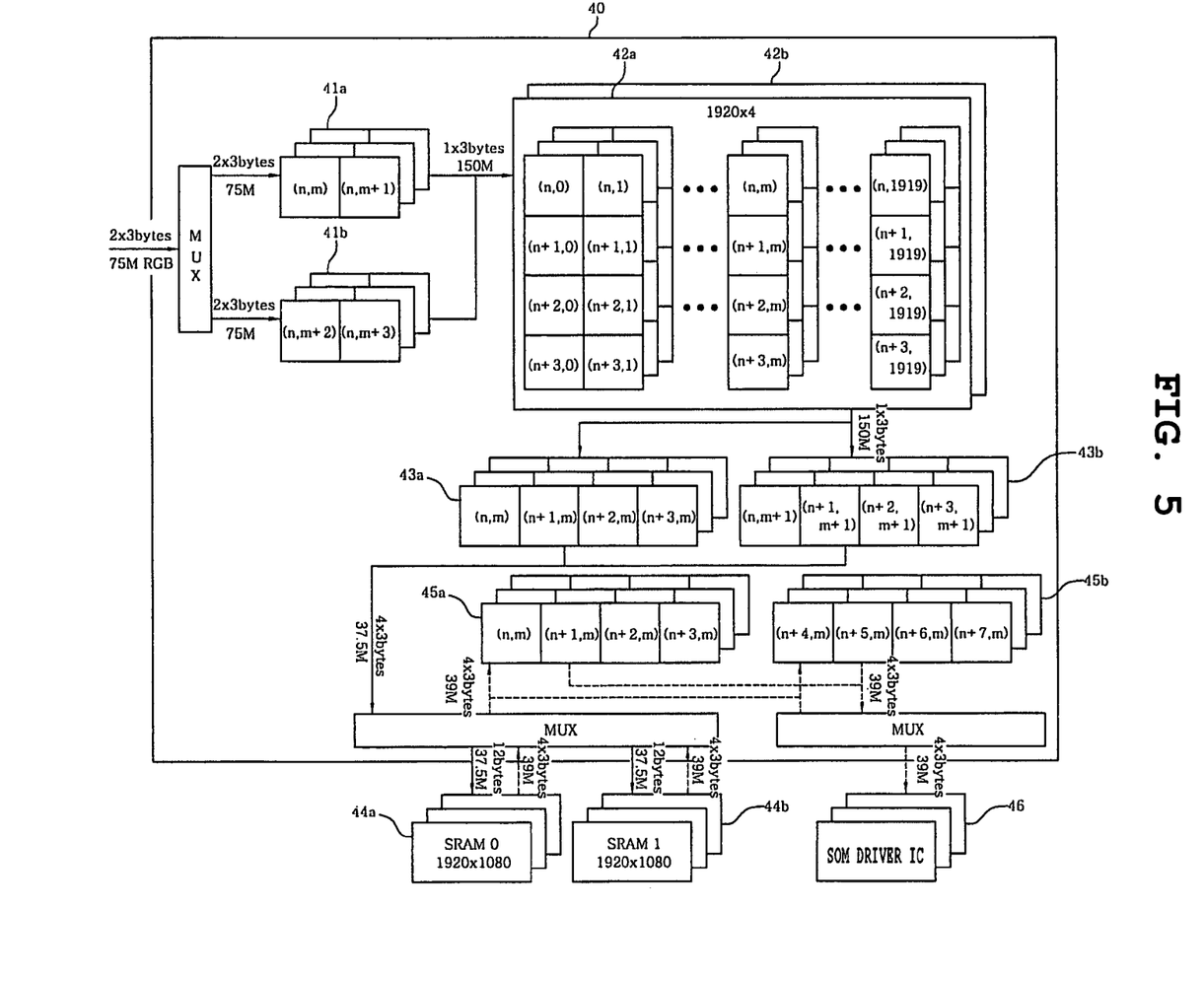
FIG. 5 is a detailed diagram showing the construction of a three-panel type data transposing apparatus in accordance with the present invention.

FIG. 5 is a detailed diagram showing the construction of a three-panel type data transposing apparatus in accordance with the present invention.

In the following description, it is assumed that input image data is RGB image data composed of 1920×1080 pixels (K=1920 and L=1080) that corresponds to the universal HDTV standard, as shown in FIG. 2a. Furthermore, although each pixel has a variable data size, it is assumed that each pixel is generally composed of three bytes, the three bytes corresponding to RGB signals, respectively.

Although the size of the signal input through the input register 41 is variable, it is assumed that two bytes are assigned to RGB signals and a transmission speed is 150 MHz. 150 M, 75 M, 37.5 M and so forth indicated around arrows representing data transmission lines in FIG. 5 represent the data transmission speeds of the data transmission lines, respectively.

An image data signal input from the outside is input to line memories 42a and 42b through input registers 41a and 41b on a 2-byte-at-a-time basis with 2×3 bytes assigned to RGB signals. The input registers 41a and 41b alternately perform read and write operations. In other words, while the input register 41a records data in the line memory 42, the input register 41b reads external data. In contrast, while the input register 41b records read data in the line memory 42, the input register 41a reads another piece of external data. The input registers 41a and 41b record data in a pair of line memories 42a and 42b at a transmission speed of 150 MHz on a 1×3-byte-at-a-time basis for RGB signals.

The line memories 42a and 42b receive data from the input register 41a and 41b and store a data array having a 1920×4 byte size. In a general case, that is, in the case where image data is K×L bytes, the line memories 42a and 42b store a data array having a K×N byte size (N≧2). The line memories 42a and 42b alternately operate in read and record modes. That is, while data is recorded in the line memory 42a, data in the line memory 42b is read by the write registers 43a and 43b. In contrast, while data is recorded in the line memory 42b, data in the line memory 42a are read by the write register 43a and 43b. After the data array having a K×N byte size is completely recorded in the line memory 42a, recording in the line memory 42b is initiated.

Figure 6A:
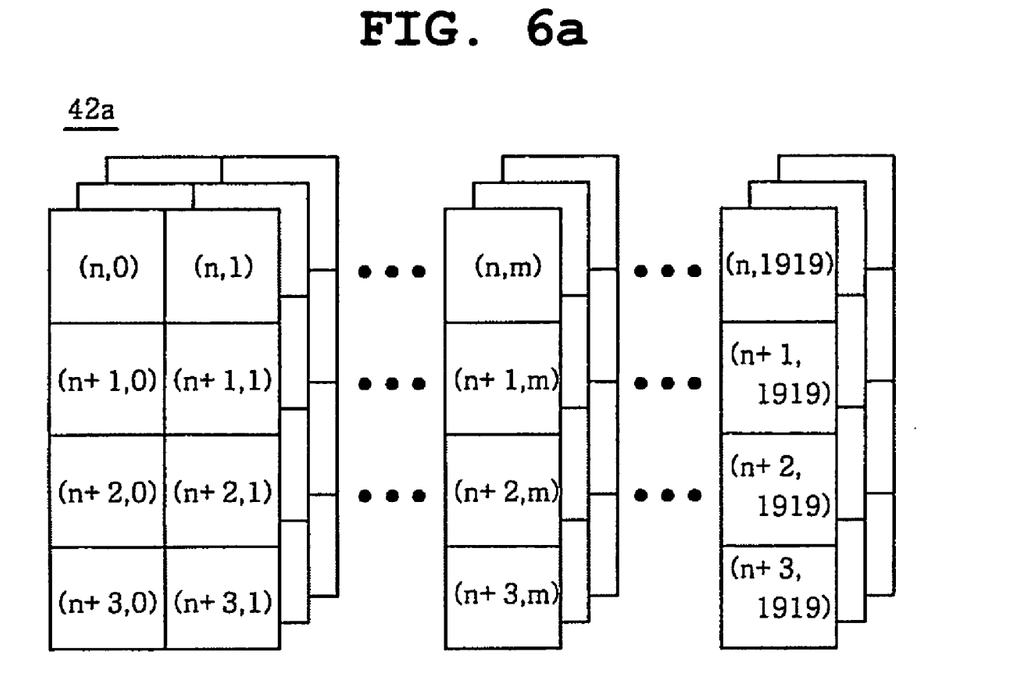
FIGS. 6a and 6b are views showing data arrays stored in the line memories, respectively.
Figure 6B:
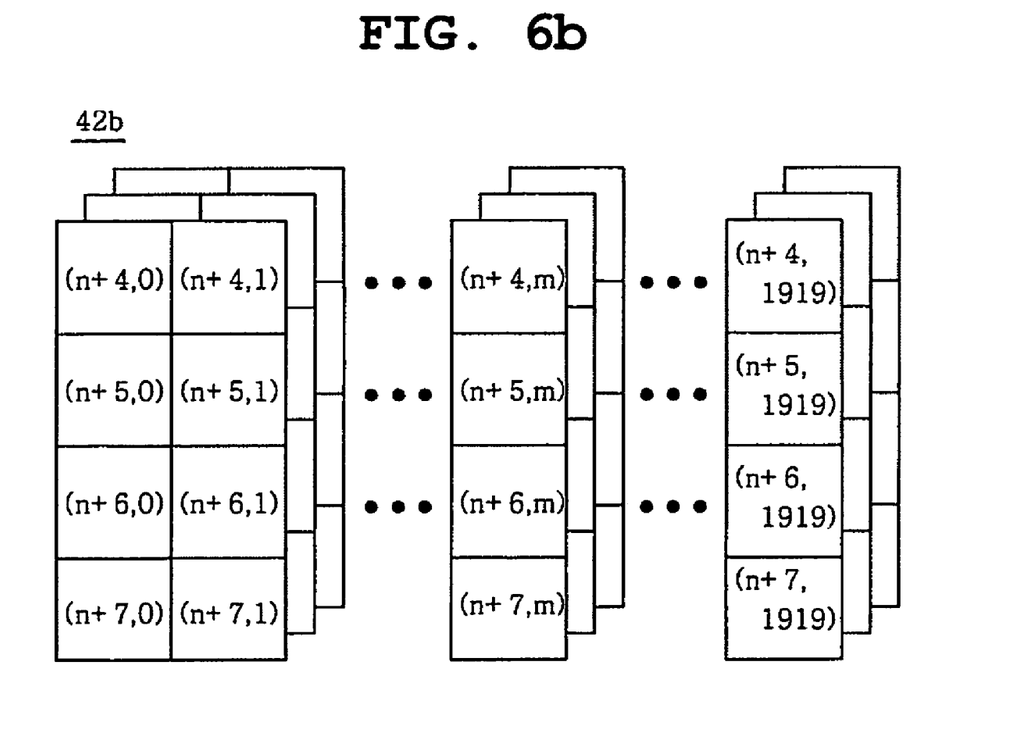

FIGS. 6a and 6b show data arrays stored in the line memories 42a and 42b, respectively.

Data arrays having a K×N byte size stored in the line memories 42a and 42b are read by the write registers 43a and 43b and recorded in the memories 44a and 44b on an N-byte-at-a-time basis. If data are recorded in the line memories 42a or 42b by the input registers 41a and 41b on a 2-byte at-a-time basis and N is 4, input to and output from the memories 44a and 44b are performed on a 4-byte-at-a-time basis, i.e., a basis 2 times greater than the basis for the input of data, so that each of the input and output speeds of memories 44a and 44b is half of the input speed, i.e., 37.5 MHz.

In that case, the write registers 43a and 43b read the data from the left side of the line memories 42a and 42b, shown in FIGS. 6a and 6b, respectively, on an N-byte-at-a-time basis and record the data in the memories 44a and 44b. In the same manner, the write registers 43a and 43b alternately perform read and write operations.

Figure 7:
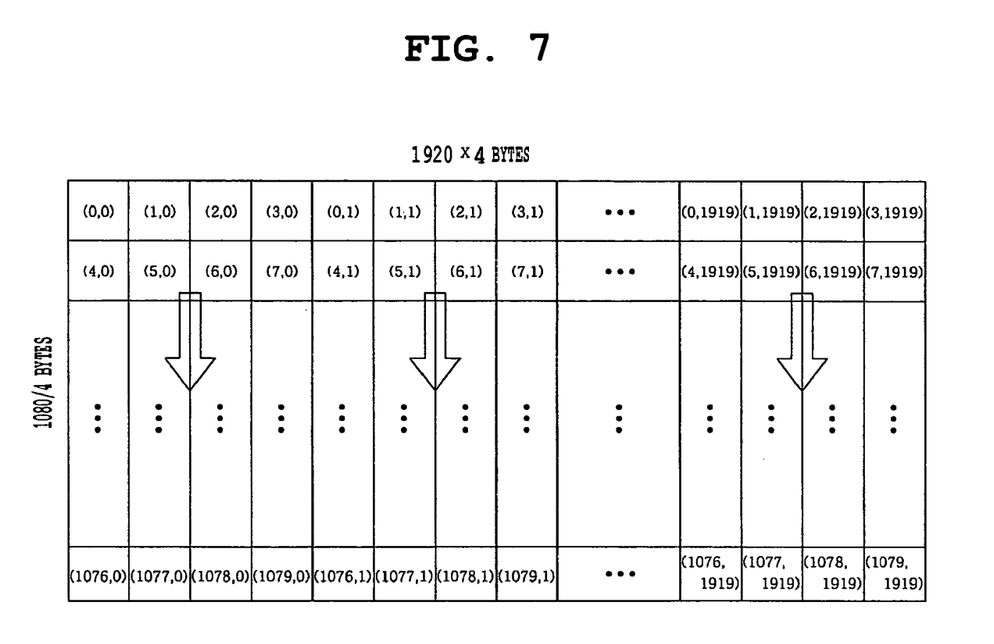
FIG. 7 is a view showing the construction of a data array stored in each of the memories.

The 4-byte data read by the write registers 43a and 43b are recorded in the memories 44a and 44b in the form as shown in FIG. 7, respectively. The memories 44a and 44b must be memories each having a capacity greater than that that is required to store one frame of image data. That is, the memories 44a and 44b each has a capacity of at least 1920×1080 bytes and, if input image data is composed of K×L pixels per frame and each pixel is composed one byte, the memories 44a and 44b each must has a capacity of at least K×L bytes.

FIG. 7 shows the construction of one frame of image data stored in the memories 44a and 44b. As shown in FIG. 7, the 4-byte data read by the write registers 43a and 43b are stored in the memories 44a and 44b in reading order. After one frame of image data is completely stored in the memory 44a, a next frame of image data is stored in the memory 44b in the same form. A pair of memories 44a and 44b exists for RGB signals and alternatively operates in write and read modes. If data to be stored in the line memories 42a and 42b is a K×N byte data array, the data are transmitted to the memories 44a and 44b on an N-byte-at-a-time basis.

Although for convenience of description, a specific memory block is shown in FIG. 7, it can be understood by those skilled in the art that data is not actually stored in this form, but is physically stored at an arbitrary location in a memory. The construction of a memory shown in FIG. 7 is provided to illustrate the addressing concept of a memory.

The image data stored in the memories 44a and 44b are read by the output registers 45a and 45b vertically, i.e., along the arrows shown in FIG. 7 on a 4-byte-at-a-time basis. The data read by the output registers 45a and 45b are transmitted to the SOM driver 46. A pair of output registers 45a and 45b exists for RGB signals and alternately performs read and write operations. In the same manner, if data stored in the line memories 42a and 42b is a K×N byte data array, the data is transmitted to the memories 44a and 44b on an N-byte-at-a-time basis.

In the case of an HDTV standard, if it is assumed that a reference frequency is 60 Hz, N=4 and the active time for scanning image data in the SOM device is 80% of the total scanning time for one frame, it is preferable to operate the memories 44a and 44b at a frequency of 39 MHz so as to read the data stored in the memories 44a and 44b according to the following Equation, 1920×1080×60/(4×0.8)=39 MHz If the data stored in the memories 44a and 44b are read as described above, the image data shown in FIG. 2a are transposed.

In the three-panel type data transposing apparatus, three SOM driver ICs 46 exist, and perform control so that transposed data are received for RGB signals and SOM devices (not shown) appropriately scan the transposed data.

Figure 9:
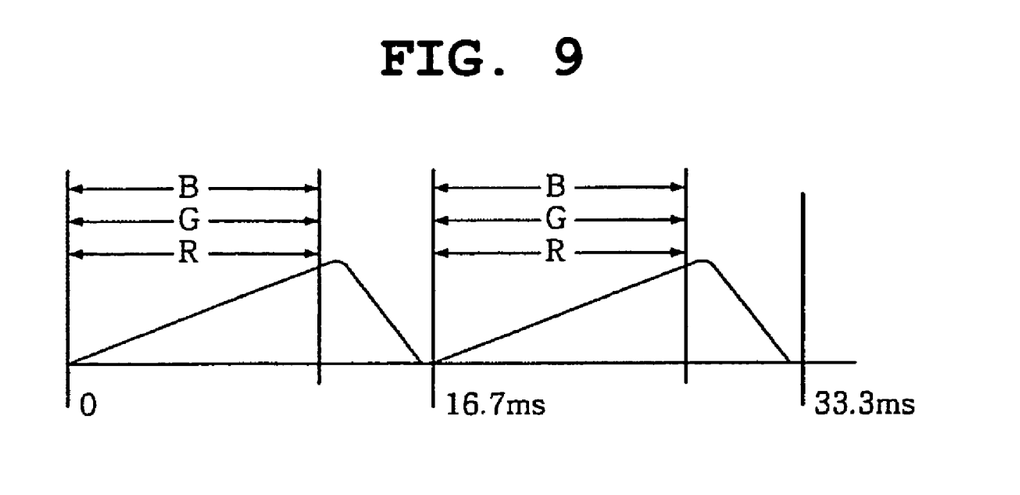
FIG. 9 is a view showing an output waveform scanned by SOM devices in accordance with the three-panel type data transposing of the present invention.

FIG. 9 shows an output waveform scanned by the SOM devices in accordance with the three-panel type transposing apparatus of the present invention. In the case of the HDTV standard, if the reference frequency is 60 Hz, each frame of image data is output every 16.7 ms. RGB signals are simultaneously scanned by the SOM devices.

Figure 8:
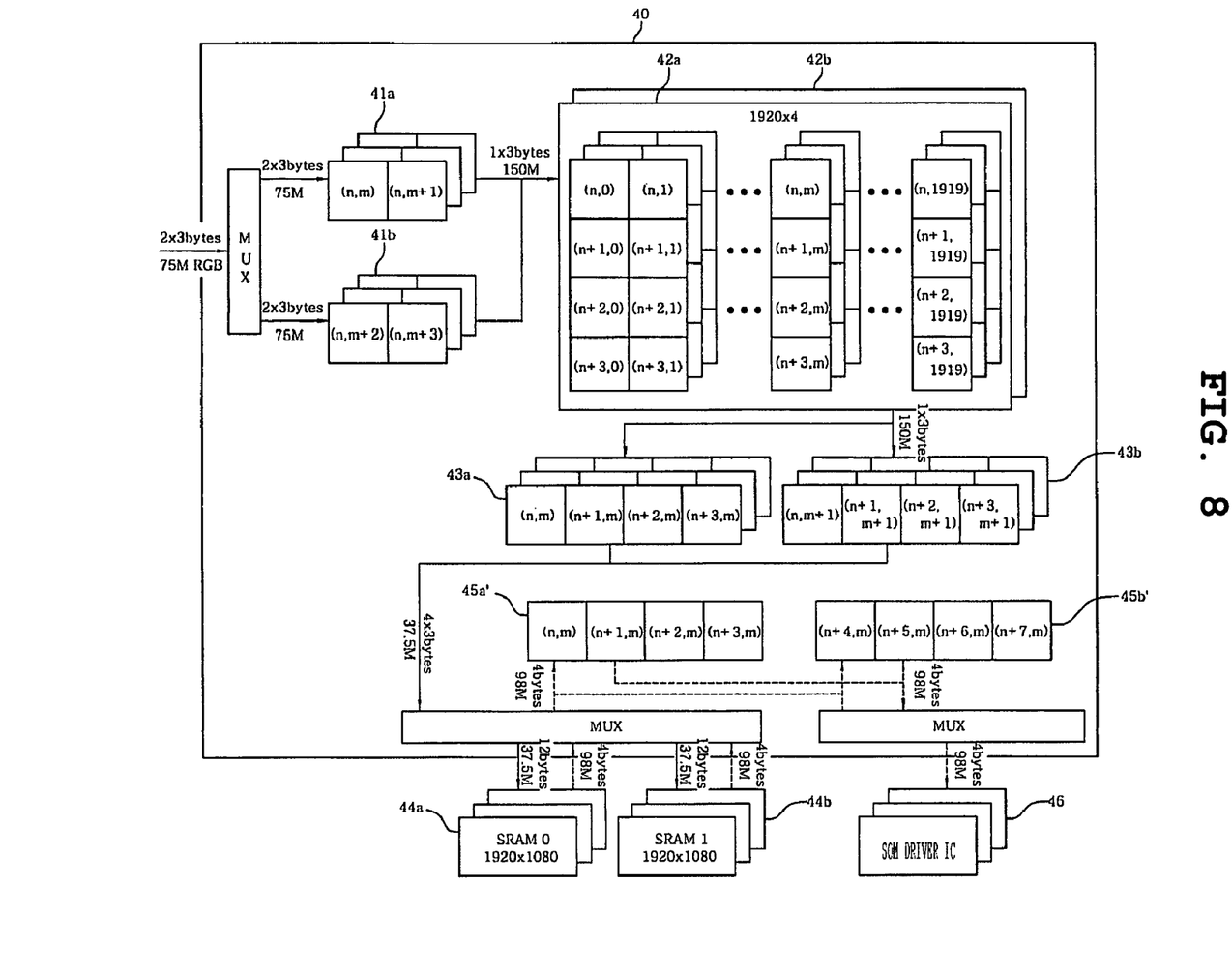
FIG. 8 is a diagram showing the more detailed configuration of a one-panel type data transposing apparatus in accordance with another embodiment of the present invention.

FIG. 8 shows the more detailed configuration of a one-panel type data transposing apparatus in accordance with another embodiment of the present invention.

The one-panel type data transposing apparatus shown in FIG. 8 is identical to the three-panel type data transposing apparatus shown in FIG. 5 except that the one-panel type data transposing apparatus has a pair of output registers 45a and 45b. The output registers 45a and 45b sequentially receive RGB signals from memories 43a and 43b and transmit the signals to an SOM driver IC 46. The SOM driver IC 46 performs control so that a single SOM device (not shown) sequentially scans the sequentially received RGB signals.

In the case of the HDTV standard, if a reference frequency is 60 Hz, N=4 and the active time for scanning image data in the SOM device is 95% of the scanning time for one frame, in order to read the data stored in the memories 44a and 44b, it is preferable to set the access speed of the memories 44a and 44b to 98 MHz according to the following Equation:

1920×1080×60×3/(4×0.95)=98 MHz

Figure 10:
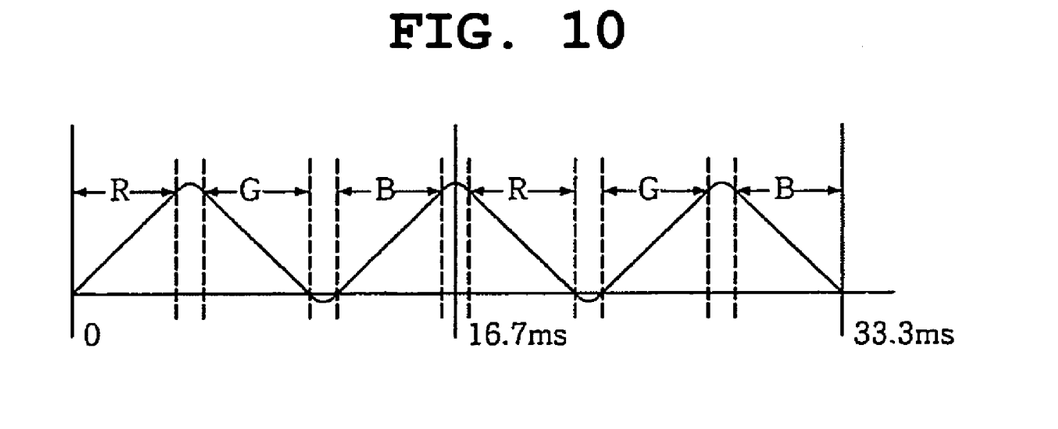
FIG. 10 is a view showing an output waveform scanned by an SOM device in accordance with the one-panel type transposing apparatus of the present invention.

FIG. 10 shows an output waveform scanned by the SOM device in accordance with the one-panel type transposing apparatus of the present invention. In the same manner, in the HDTV standard, if a reference frequency is 60 Hz, one frame of image data is output every 16.7 ms. The RGB signals are sequentially scanned at regular intervals.

In accordance with the data transposing apparatus and method of the present invention, the same amount of image data can be processed at a speed that is lower than that of the conventional data transposing apparatus and method, so that the data can be processed using a memory having a lower data input/output speed.

Furthermore, the data transposing apparatus and method of the present invention can reduce noise that may be generated in a circuit, and increase the operational reliability of memories.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for transposing data, comprising:
a pair of line memories for horizontally reading image data a frame of which is composed of K×L byte data (row length: K bytes, column length: L bytes), and alternately storing data arrays each having a K×N byte size (N>2);
a pair of memories for alternately reading the image data from the line memories on an N-byte-at-a-time basis and each storing a data array corresponding to one frame;
write registers for addressing the data of the line memories on an N-byte-at-a-time basis and transferring the data to the memories; and
output units for vertically addressing the data arrays stored in the memories on an N-byte-at-a-time basis and outputting the addressed data arrays.

2. The apparatus as set forth in claim 1, further comprising input registers for reading external data and transferring the external data to the line memories.

3. The apparatus as set forth in claim 1, wherein the output units comprise output registers for addressing the data arrays stored in the memories on an N-byte-at-a-time basis.

4. The apparatus as set forth in claim 1, wherein the line memories and the memories are two for each of the RGB signals each and the output units are two for all the RGB signals.

5. A method of transposing data comprising the steps of:

horizontally reading image data a frame of which is composed of K×L byte data (row length: K bytes, column length: L bytes), and alternately storing data arrays each having a K×N byte size (N>2) in a pair of line memories;

addressing the data of the line memories on an N-byte-at-a-time basis and transferring the data to a pair of memories using a write register;

alternately reading the image data from the line memories on an N-byte-at-a-time basis and each storing a data array corresponding to one frame in each of the pair of memories; and vertically addressing the data arrays stored in the memories on an N-byte-at-a-time basis and outputting the addressed data arrays.

* * * * *